Figure 1:
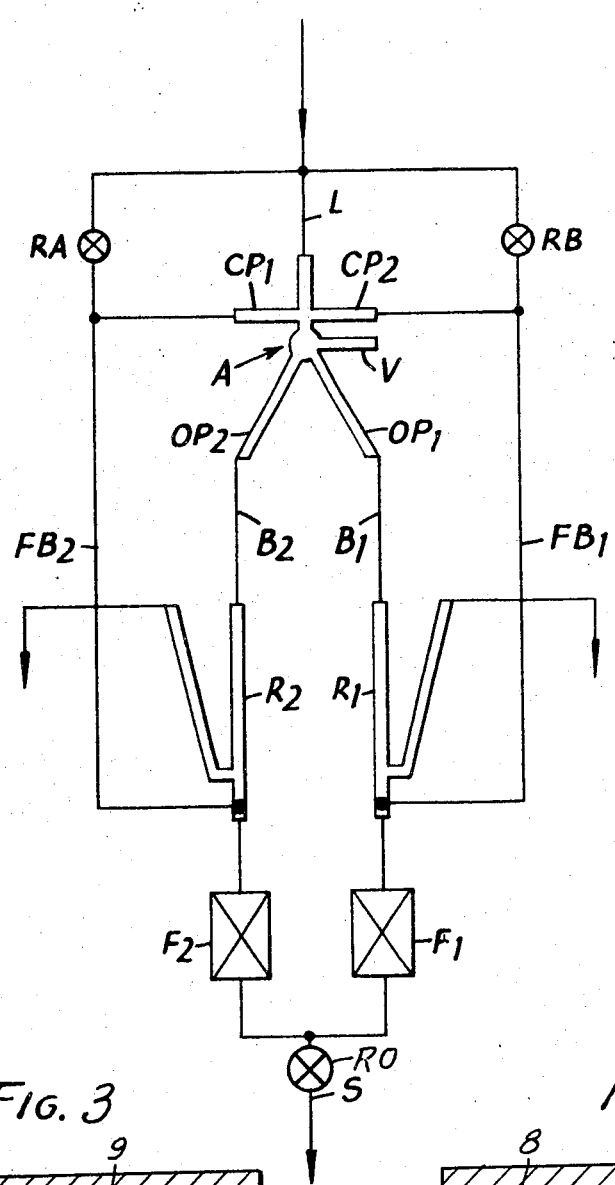

United States Patent

[11] 3,630,362

| [72] | Inventor | Robert B. Matthews<br>Ilford, Essex, England |
| --- | --- | --- |
| [21] | Appl. No. | 823,090 |
| [22] | Filed | May 8, 1969 |
| [45] | Patented | Dec. 28, 1971 |
| [73] | Assignee | The Plessey Company Limited<br>Ilford, England |
| [32] | Priority | May 23, 1968 |
| [33] | | Great Britain |
| [31] | | 24,603/68 |

[54] SELF-CLEANING FILTER SYSTEMS
3 Claims, 4 Drawing Figs.

| [52] | U.S. Cl. | 210/108,<br>210/333, 210/341 |
| --- | --- | --- |
| [51] | Int. Cl. | B01d 29/38 |
| [50] | Field of Search | 210/108,<br>333, 341 |

[56] References Cited
UNITED STATES PATENTS

| 3,157,131 | 11/1964 | Brydon | 210/108 X |
| --- | --- | --- | --- |
| 3,388,799 | 6/1968 | Rymer | 210/108 X |

*Primary Examiner*—Frank A. Spear, Jr.
*Attorney*—Blum, Moscovitz, Friedman & Kaplan ABSTRACT: To ensure, by purely fluidic means, the alternate use of two filter units, one being in the main fluid path while the other is being reconditioned by back flushing with filtered liquid, two parallel branch paths are interposed between the main-flow inlet of a bistable fluidic device and a service outlet each branch including a filter and having a reverse-flow switch interposed between the bistable, which has two control jets, and the filter so as to conduct flow from the bistable to the filter but divert flow from the filter into a spill path, the switching of the bistable device being controlled by connecting the inlet of each control jet in parallel to the inlet of the appropriate filter and, via a restrictor to the fluid inlet of the system.

PATENTED DEC 28 1971

3,630,362

SHEET 1 OF 2

SELF-CLEANING FILTER SYSTEMS

This invention relates to self-cleaning filter systems of the kind in which two filters are arranged to be alternately included in the flow of a fluid from a source of impure fluid to a consumer of pure fluid, means being provided which permit during the inclusion of each filter in this flow the other filter to be flushed by passing purified fluid through it in the reverse direction at a slow rate, or for a short time, to scavenge the impurities out of the filter and flush them away to a suitable spill outlet.

The invention has for an object to provide an improved self-cleaning filter system of the kind specified, in which fluidic devices having no movable parts, also known as pure fluidic devices, are employed for performing all the switching operations involved. The term 'fluidic device' when employed in this specification relates to a device whose operation does not depend on any mechanically movable part in the device.

According to the invention in its broadest aspect, the flow of liquid from the source is conducted through a bistable fluidic device selectively into one or the other of two parallel paths, each path leading from the amplifier via a separate fluidic reverse-flow switch and, subsequently downstream of the latter, a separate filter element, to a service line leading to the consumer, the bistable fluid device having two control jets whose respective operation will cause the incoming fluid to adopt one or the other of the two parallel paths, while each reverse-flow switch is arranged to ensure that flow coming from the bistable device towards the filter element will be passed on substantially completely to the filter element, while conversely in the opposite direction coming from the filter element will be diverted so that substantially the whole of such reverse flow will pass through a branch line to a spill outlet, substantially none of the liquid coming from the filter being allowed to return to the bistable fluidic device. The flow resistance of the service line an consumer itself, supplemented if necessary by an added resistive element, ensures that a small portion of the fluid supplied from the source and arriving, after passing through the reverse-flow switch and filter element along one of the two parallel branches, will flow back through the filter element in the other branch and escape to the spill outlet via the reverse-flow switch of said other branch and will thus ensure flushing and scavenging of the filter element in that one of the two branches which is not used for filter operation.

While the operation of control jets may be effected in any desired manner, for example manually or by a timing device, the preferred form of the invention also contains fluidic means for automatically effecting the changeover of the bistable amplifier in response to an increase in the resistance of the filter which at each time is being used for the filter operation proper.

Figure 3:
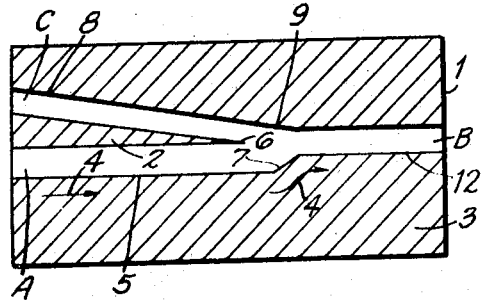
Figure 4:
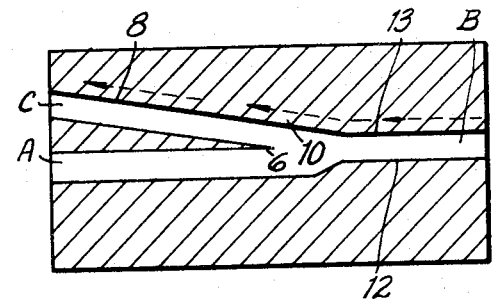
Figure 2:
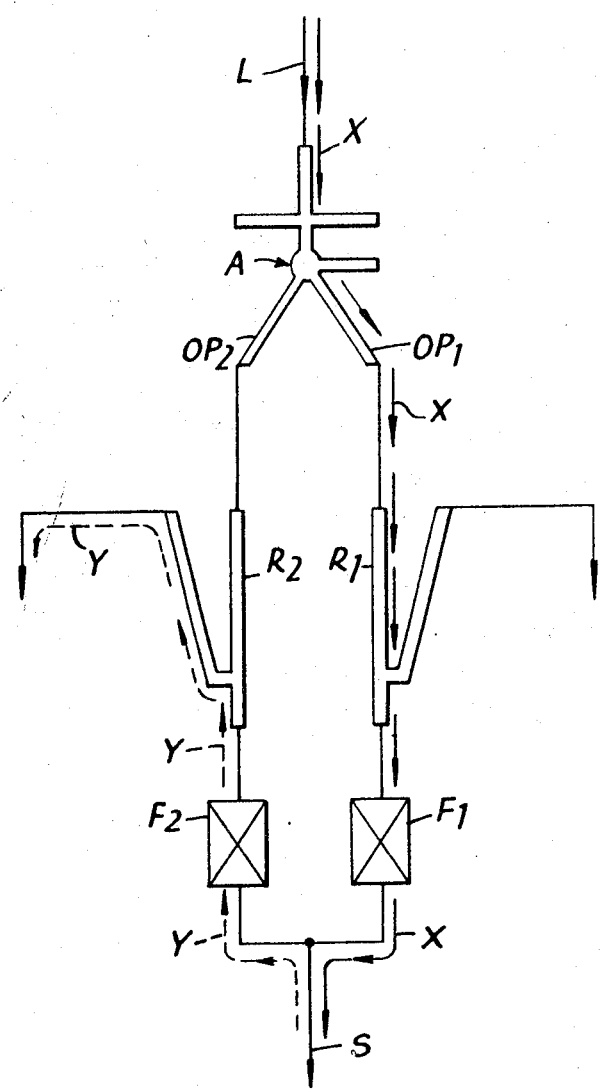

In order that the invention may be more readily understood, reference will now be made to the accompanying drawings in which FIG. 1 diagrammatically illustrates an embodiment including this automatic control feature, FIG. 2 shows the respective arrangement of the two filter elements in the two branches with indication of the direction of flow in the individual elements when the branch shown at the right-hand side of the Figure is being used for filtering, and FIGS. 3 and 4 illustrate one embodiment of a fluidic reverse-flow switch suitable for use in the arrangement of FIGS. 1 and 2, FIG. 3 showing the embodiment in the forward-flow condition and FIG. 4 in the reverse-flow condition.

Referring now first to FIG. 1, the fluid supply line L, coming from a dirty-fluid supply not shown, is connected to the main-flow inlet of a wall attachment type bistable fluidic device A which has two control jet inlets CP1 and CP2 which when pressurized will respectively cause the incoming fluid to be diverted to a first main-flow outlet OP1 or to a second main-flow outlet OP2, each leading to one of two parallel flow branches B1 and B2. Each branch is equipped with a fluidic reverse-flow switch R1 or R2, each of which is preferably constructed as described hereinafter with reference to FIGS. 3 and 4, and each reverse-flow switch is followed by a filter element F1 or F2 at the outlet side of the filter elements F1 and F2 the two branches are reunited for connection to a service line S, constituting the consumer for filtered liquid and this service line may incorporate a restrictor RO if this is desired or necessary to ensure a slight pressure buildup at the inlet end of the service line.

Referring now to FIGS. 3 and 4, each reverse-flow switch may be assumed to consist of a block 1 of suitable plastics material which has engraved therein a passage system comprising a stem or common passage portion constituting a main passage B, which at its left-hand end is joined by two branches A and C separated by a wedge-shaped flow-divider portion 2. The passage system is closed by a cover plate, which may be a plain panel 3 of transparent material. The branch A is intended to serve as the inlet passage, through which fluid is introduced for operation in the normal or forward-flow condition illustrated in FIG. 3, the direction of flow being indicated by arrows 4. It will be observed that the outer wall 5 of the passage A, that is to say its wall opposite to the flow divider 2, extends in the direction of the main passage B but is laterally offset relative the corresponding wall of that passage by approximately the width of the branch, so that the knife edge 6 and that surface of the divider 2 which forms the inner wall of the branch passage A, lies approximately in the same plane as the said wall of the main passage B. Beyond the edge 6 the outer wall 5 of the inlet branch passage A is deflected by approximately 45° to form an angular wall portion 7 before joining the corresponding wall of the main passage B. The other branch passage C, which constitutes the reverse-flow outlet, extends away from the inlet branch A at a small angle to the line of the main passage B, and its outer wall 8 is continued in a straight line to near its point of intersection 9 with the line of the corresponding wall of the common passage portion B, the zone of intersection being preferably rounded to assist the Coanda effect in maintaining the reverse flow in contact with the said outer wall 8, while at the side of the main passage B adjacent to the outlet branch A the angular wall portion 7 facilitates detachment of the reverse flow from the passage wall, thus counteracting any tendency of the reverse flow indicated by the arrows 10 in FIG. 2 to enter the inlet passage A.

In order to ensure automatic changeover between the two branches, feedback loop lines FB1 and FB2 lead from a point between filter F1 or F2 and its respectively associated reverse-flow switch R1 or R2 to that control-jet inlet CP2 or CP1 which when pressurized will deflect the flow to the other branch B2 or B1, and each feedback loop is further connected via an associated restrictor RA or RB to the dirty-fluid supply line L.

Assuming that the A is operative at a given time to produce and bearing in mind that flow through branch B1, flow from each of the control restrictors RA and RB travels along the path of least resistance, it will be seen that, as long as filter F1 is reasonably clear, flow from restrictor RA will pass through control jet CP1 into the main flow and will thus cause the main flow to continue flowing through the filter F1. Furthermore, as long as the filter element F1 is reasonably clear, flow from restrictor RB will pass without much resistance into the service line S through the filter F1, and reverse flow through filter element F2 will similarly pass through the reverse-flow switch R2 to the spill-flow outlet. As resistance in the filter element F1 builds up however, the pressure at the entrance to filter element F1 will cause a greater portion of the flow from restrictor RB to be diverted into control jet CP2 and when the flow-resistance of this filter element reaches a critical value the strength of this jet is sufficient to overcome the wall-attachment effect of the incoming flow in the bistable device and divert the flow into the other branch B2, thus causing the filter circuit to be switched over so that now the cleaned filter F2 commences filtering and the congested filter F1 is flushed by reverse flow. The stability and sensitivity of switching may be adjusted by varying the resistance of the restrictors RA and RB, according to the amount of contaminant collected by filter before reversal of the flow is desired.

In FIG. 2, the directions of flow of the fluid in one mode of operation of the filter are depicted in FIG. 2, forward filtering flow being indicated by full-line arrows X while reverse or flush-through flow is indicated by broken line arrows Y.

What I claim is:

1. A self-cleaning filter system for the flow of fluid from a source of impure fluid to a consumer of filtered fluid at a pressure lower than that at the source, which comprises a pure fluidic bistable switch having, two opposite wall surfaces confining between them a passage forming a main-flow inlet for connection to such source at one end, and branched at its other end to form two main flow outlets connected to said main-flow inlet in parallel to each other as to enable the Coanda effect of said wall surfaces to alternately establish a first stable flow condition in which substantially all said main flow will pass through one, and a second stable flow condition in which substantially all said main flow will pass through the other main-flow outlet, and two control inlets having jet-forming means for the respective production of fluid jets acting upon the flow from the main-flow inlet to respectively change the main flow from said first stable flow condition to said second stable flow condition and vice versa, two filter elements respectively connected to said two main-flow outlets, and two pure-fluidic reverse-flow switches each having a through passage and a spill outlet, said through passages of the two reverse-flow switches being respectively interposed in the connection between each main-flow outlet of the bistable device and the associated filter, and each reverse-flow switch being so arranged as to permit flow from the bistable device through said through passage to the filter but to divert to said spill outlet flow coming from the filter in the reverse direction.

2. A filter system as claimed in claim 1, which includes fluidic means automatically effecting the changeover of the bistable device in response to an increase in the resistance of the filter through which said main flow is conducted.

3. A filter system as claimed in claim 2, wherein said fluidic means comprise, for the flow through each main-flow outlet, a bypass conduit interconnecting the inlet of the bistable device with a point between the reverse-flow switch and filter connected to said main-flow outlet, said bypass conduit including a restrictor and being connected to that control jet of the bistable amplifier which tends to divert the main flow to the other main-flow outlet.

* * * * *